United States Patent
Zhao et al.

(10) Patent No.: US 10,368,339 B2
(45) Date of Patent: Jul. 30, 2019

(54) METHOD FOR DEVICE-TO-DEVICE RESOURCE ALLOCATION, USER EQUIPMENT AND BASE STATION

(71) Applicant: Sony Corporation, Tokyo (JP)

(72) Inventors: Yong Zhao, Beijing (CN); Dahai Liu, Beijing (CN); Feng Chen, Beijing (CN); Na Wei, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/111,098

(22) PCT Filed: Jul. 29, 2014

(86) PCT No.: PCT/IB2014/063495
§ 371 (c)(1),
(2) Date: Jul. 12, 2016

(87) PCT Pub. No.: WO2015/107399
PCT Pub. Date: Jul. 23, 2015

(65) Prior Publication Data
US 2016/0381663 A1    Dec. 29, 2016

(30) Foreign Application Priority Data

Jan. 15, 2014   (CN) .......................... 2014 1 0076024

(51) Int. Cl.
*H04W 72/04*    (2009.01)
*H04W 8/00*     (2009.01)
(Continued)

(52) U.S. Cl.
CPC .......... *H04W 72/04* (2013.01); *H04W 8/005* (2013.01); *H04W 72/042* (2013.01);
(Continued)

(58) Field of Classification Search
CPC .................................................... H04W 72/04
See application file for complete search history.

(56) References Cited

U.S. PATENT DOCUMENTS

| 2012/0129540 A1 | 5/2012 | Hakola et al. |
| 2013/0109301 A1* | 5/2013 | Hakola ............... H04W 76/023 455/39 |

(Continued)

FOREIGN PATENT DOCUMENTS

| CN | 102638893 A | 8/2012 |
| WO | WO 2012/088470 | 6/2012 |

(Continued)

OTHER PUBLICATIONS

International Search Report and Written Opinion of the International Searching Authority, Application No. PCT/IB2014/063495, dated Jan. 28, 2015.

(Continued)

*Primary Examiner* — John D Blanton
(74) *Attorney, Agent, or Firm* — Myers Bigel, P.A.

(57) ABSTRACT

To allocate resources for a device-to-device discovery and/or communication to a user equipment, the user equipment receives information on allocated resources while the user equipment is connected to a mobile communication network. The user equipment continues a usage of the allocated resources for a device-to-device discovery and/or a device-to-device communication when the user equipment is in an idle mode.

22 Claims, 7 Drawing Sheets

(51) Int. Cl.
*H04W 76/14* (2018.01)
*H04W 76/36* (2018.01)
*H04W 76/38* (2018.01)

(52) U.S. Cl.
CPC ............ *H04W 76/14* (2018.02); *H04W 76/36* (2018.02); *H04W 76/38* (2018.02)

(56) References Cited

U.S. PATENT DOCUMENTS

| | | |
|---|---|---|
| 2013/0223356 A1 | 8/2013 | Khoshnevis et al. |
| 2013/0322413 A1* | 12/2013 | Pelletier ............ H04W 72/1289 370/336 |
| 2014/0185587 A1* | 7/2014 | Jang .................. H04W 36/0005 370/331 |
| 2016/0278121 A1* | 9/2016 | Agiwal ................. H04W 8/005 |
| 2016/0373915 A1* | 12/2016 | Kim ...................... H04W 76/14 |

FOREIGN PATENT DOCUMENTS

| WO | WO 2013/123674 A1 | 8/2013 |
|---|---|---|
| WO | 2015065130 | 5/2015 |

OTHER PUBLICATIONS

Communication pursuant to Article 94(3) EPC corresponding to European Patent Application No. 14780901.3 dated Nov. 13, 2018. (5 Pages).

State Intellectual Property Office of China Search Report corresponding to Chinese Patent Application No. 201410076024.5 (2 pages) (dated Sep. 13, 2017) (with English Translation).

First Notification of Office Action corresponding to Chinese Patent Application No. 2014100776024.5 (7 pages) (dated Sep. 22, 2017) (with English Translation).

\* cited by examiner

[Fig. 1]
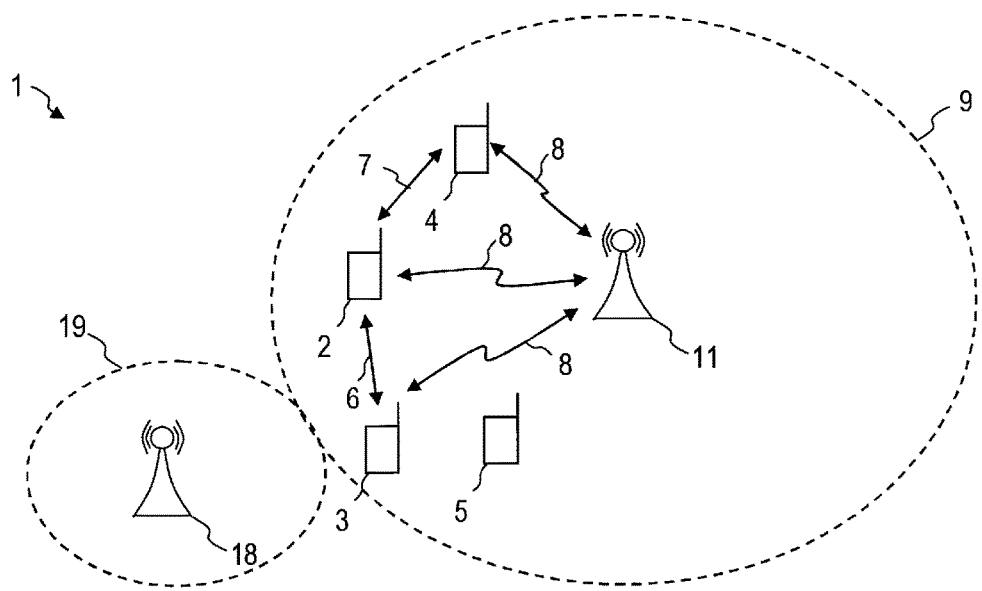
[Fig. 2]
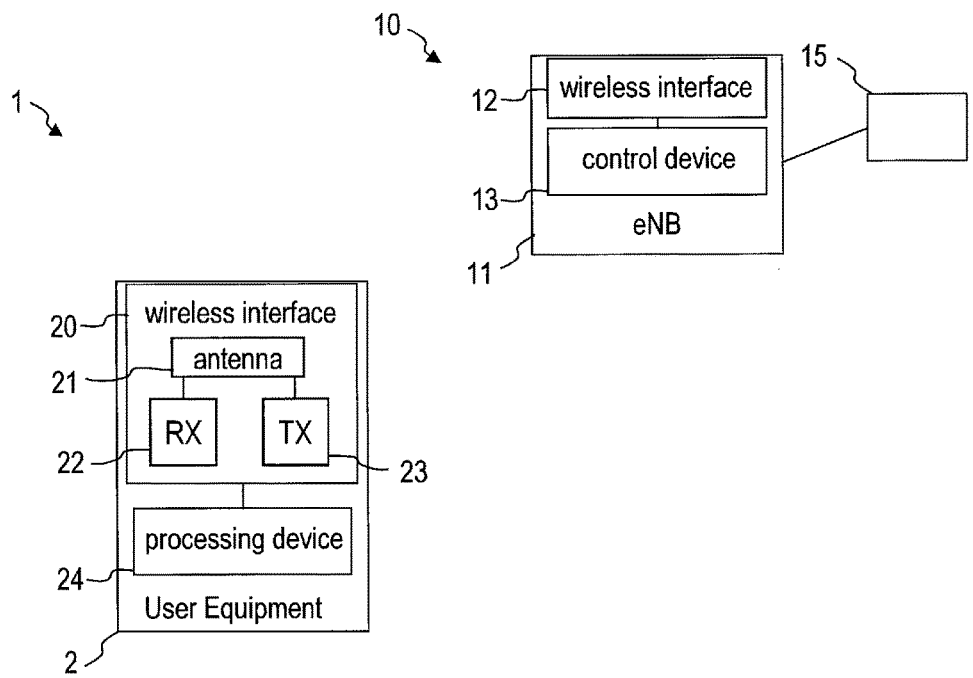

[Fig. 3]
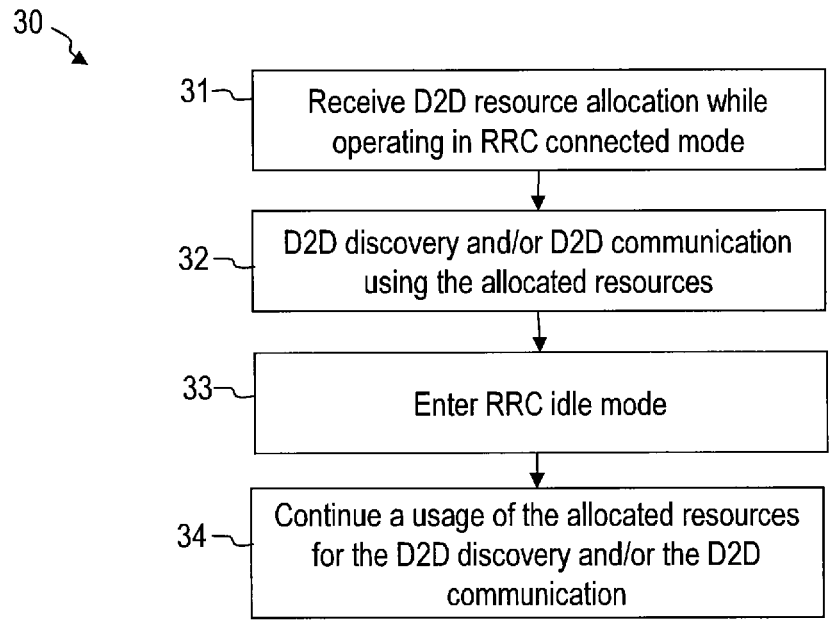
[Fig. 4]
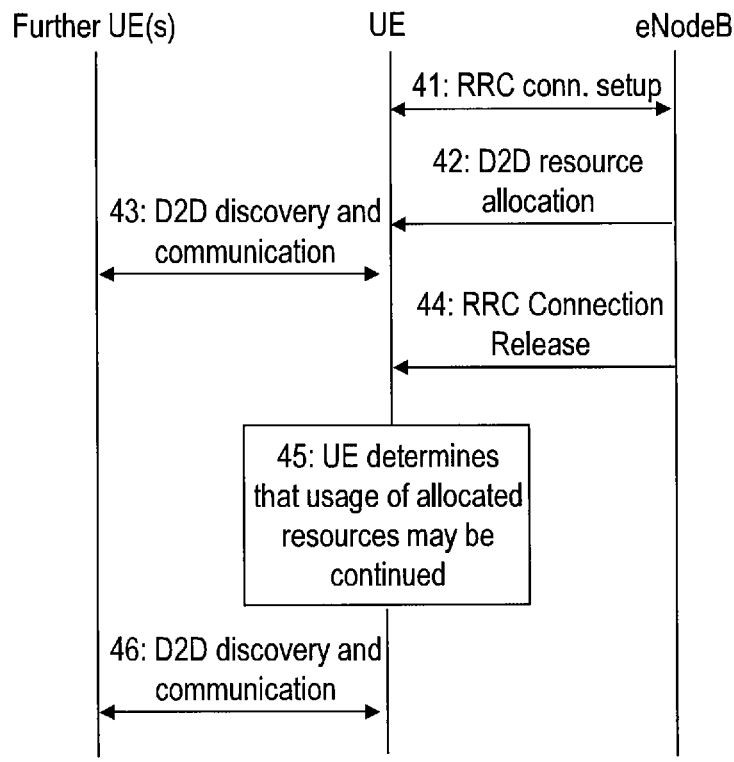

[Fig. 5]
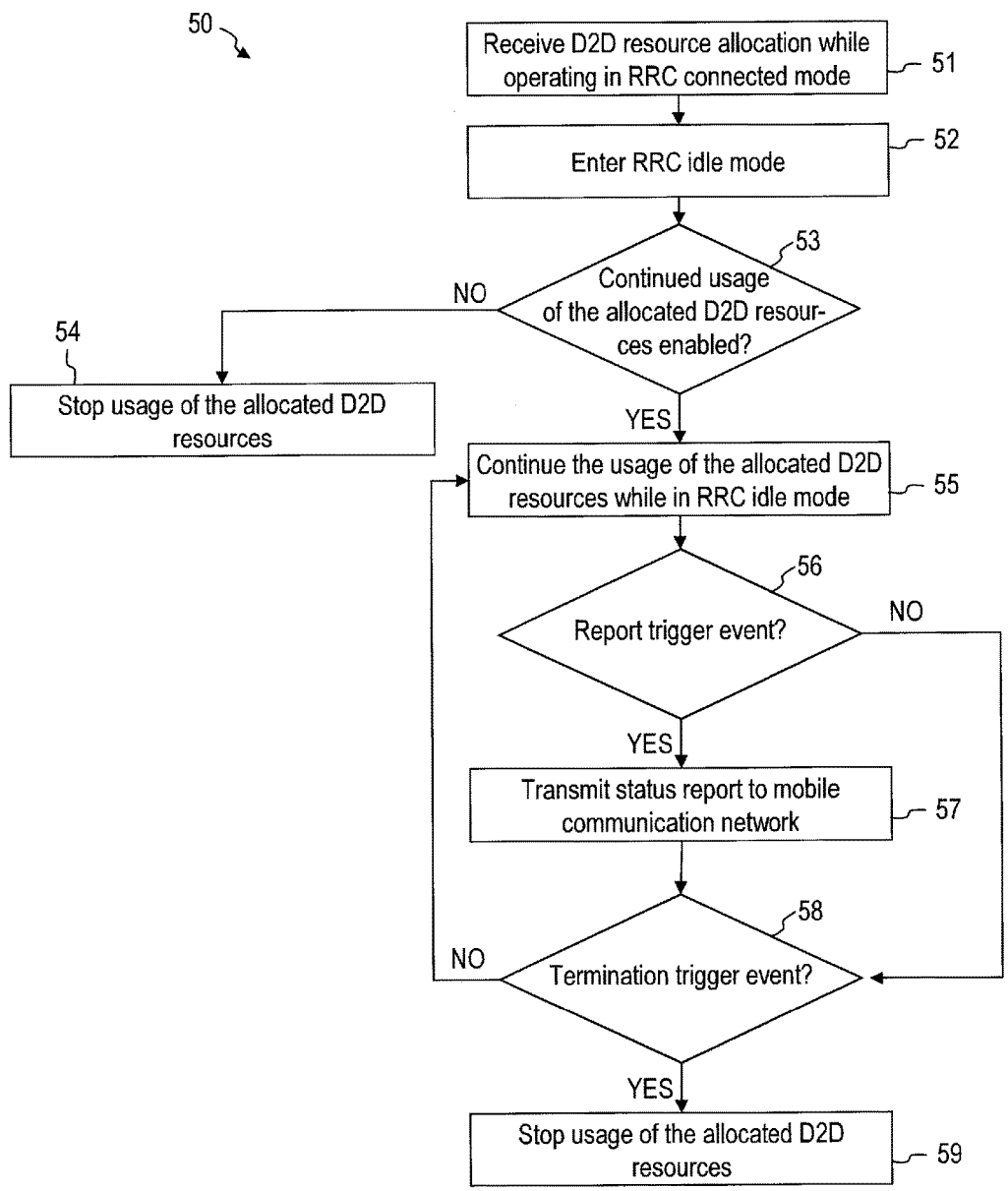

[Fig. 6]
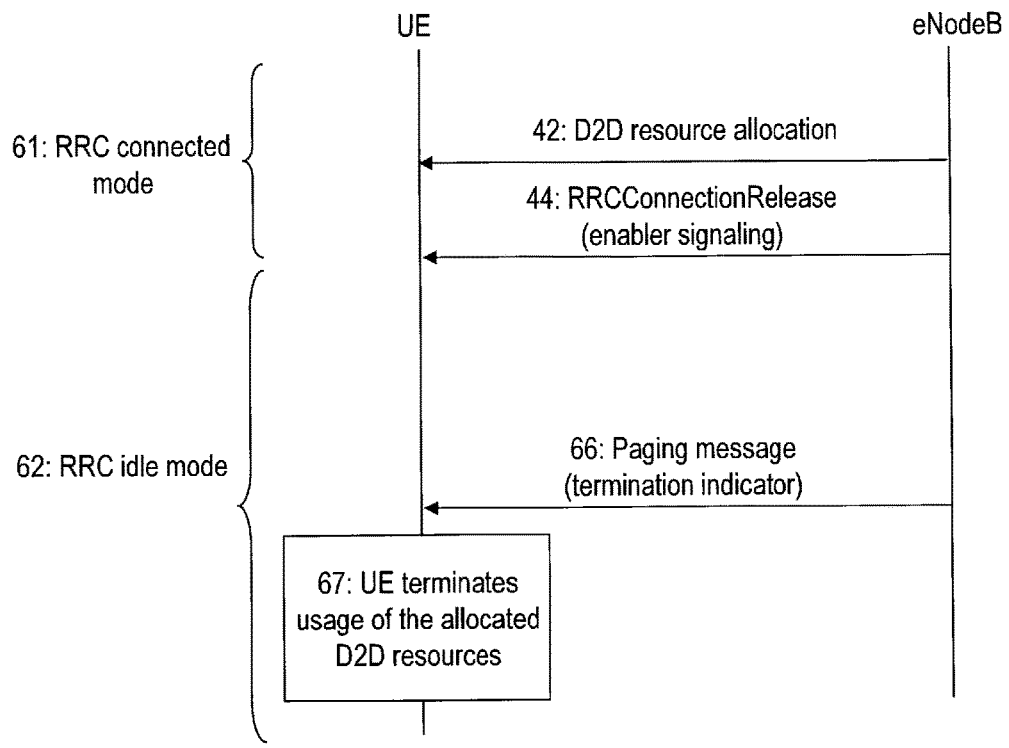
[Fig. 7]
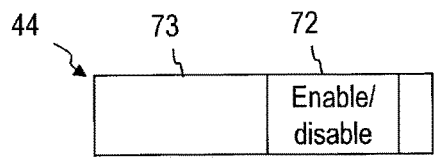
[Fig. 8]
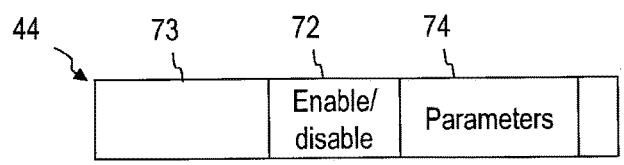

[Fig. 9]
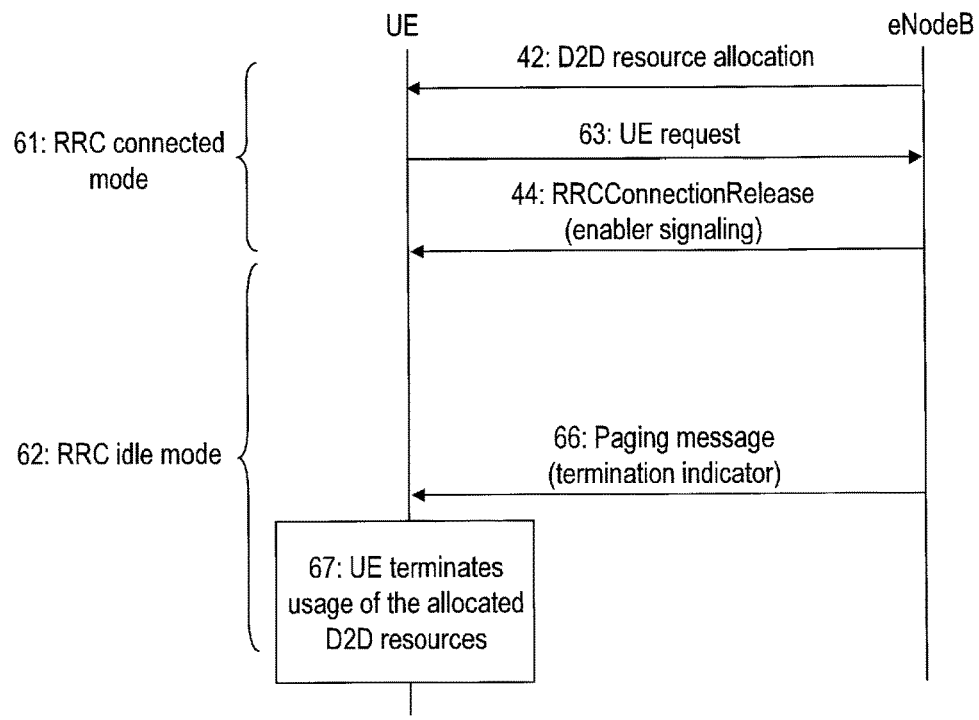
[Fig. 10]
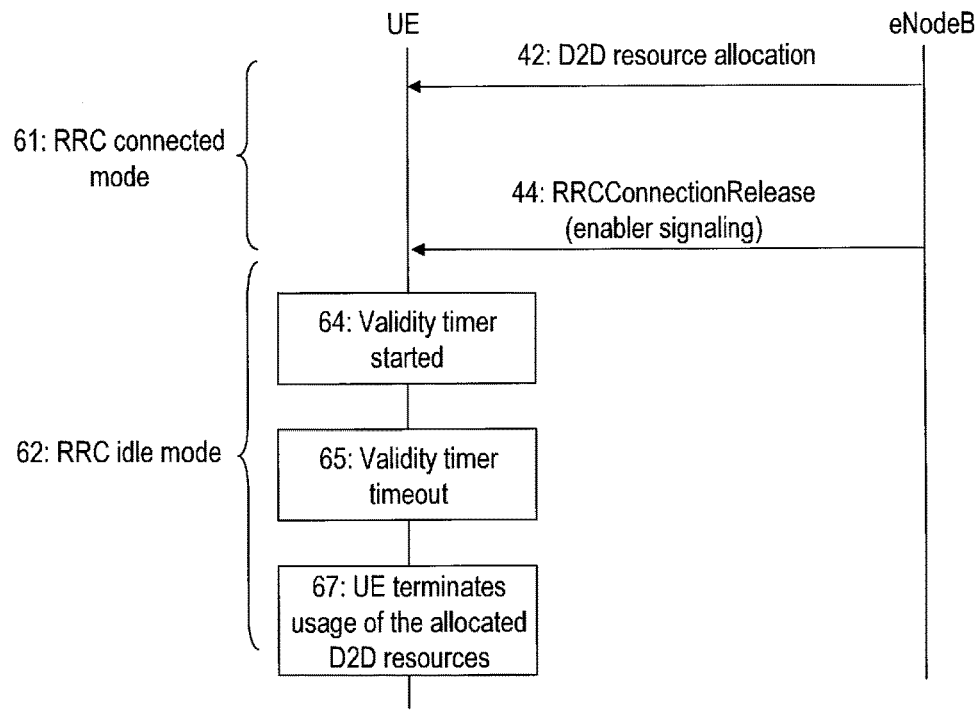

[Fig. 11]
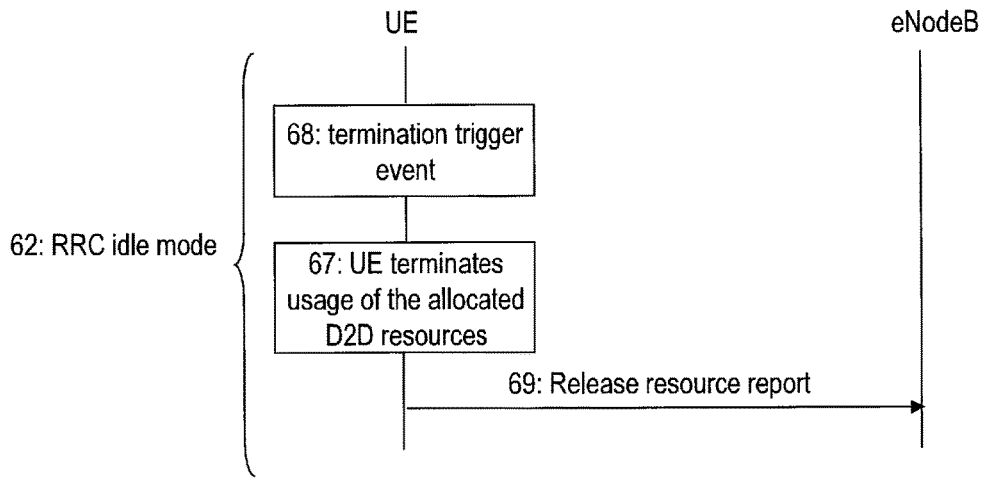
[Fig. 12]
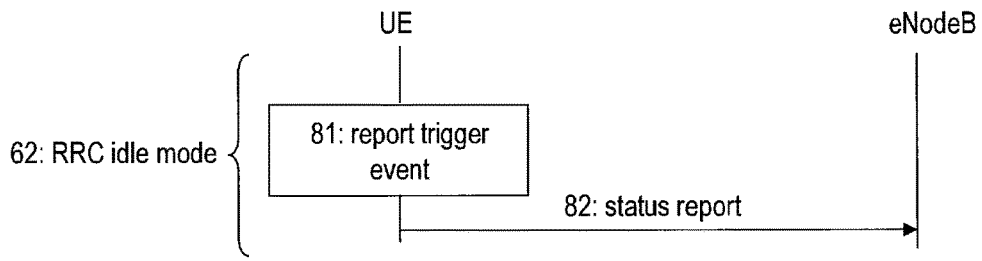
[Fig. 13]
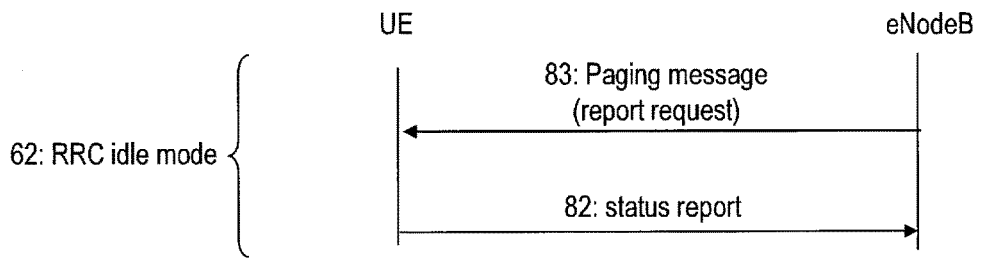
[Fig. 14]
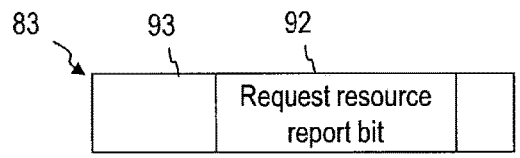

[Fig. 15]
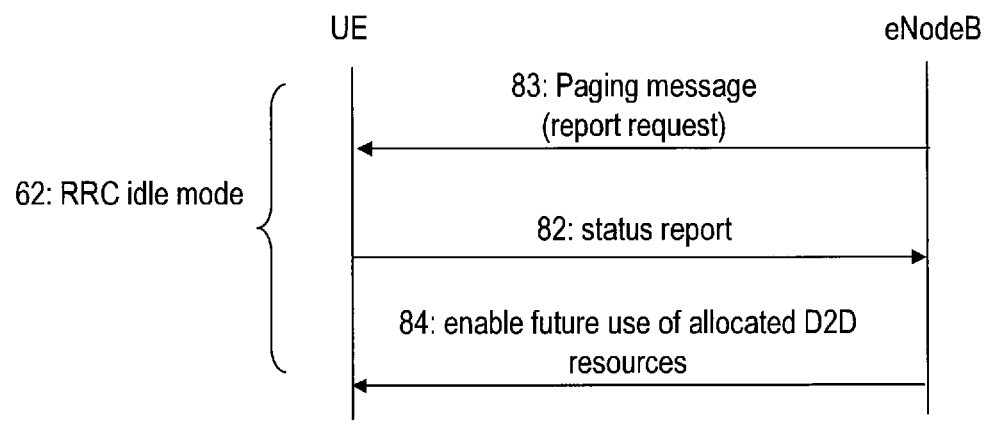

US 10,368,339 B2

METHOD FOR DEVICE-TO-DEVICE RESOURCE ALLOCATION, USER EQUIPMENT AND BASE STATION

CROSS REFERENCE TO RELATED APPLICATIONS

This application is a 35 U.S.C. § 371 national stage application of PCT International Application No. PCT/IB2014/063495, filed on Jul. 29, 2014, which itself claims the benefit of Chinese Patent Application No. 201410076024.5, filed Jan. 15, 2014, the disclosure and content of both of which are incorporated by reference herein in their entireties. The above-referenced PCT International Application was published in the English language as International Publication No. WO 2015/107399 A1 on Jul. 23, 2015.

TECHNICAL FIELD

Embodiments of the invention relate to mobile communication systems. Embodiments of the invention relate in particular to techniques for allocating resources for device-to-device discovery and/or device-to-device communication in mobile communication networks.

BACKGROUND ART

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. Direct data or voice communication between user equipments is another example for use cases of D2D communication. For illustration, ProSe enabled user equipments located in proximity to each other may engage in data or voice communication.

In order to perform D2D communication, a user equipment must be capable of detecting one or several other user equipments which are located in proximity to the user equipment. The resources, e.g. the subcarrier frequencies, slots and/or symbols which the user equipment may use for the D2D discovery may be allocated to the user equipment by a base station. Similarly, the resources, e.g. the subcarrier frequencies, slots and/or symbols which the user equipment may use for the D2D communication may be allocated to the user equipment by a base station.

Various techniques may be used for allocating resources for D2D discovery and/or D2D communication. The base station may allocate resources for the D2D discovery and/or for the D2D communication in a manner which is not specific to a particular user equipment, e.g. by broadcasting the information on the allocated resources to a group of user equipments.

At least for some use cases, it is attractive to allocate resources on a peruser-equipment basis. I.e., the D2D resources are allocated specifically to each user equipment. Examples for such use cases are D2D discovery and communication at advertisement points, e.g. at a mall or a retail shop, D2D discovery and communication at vending machines, or other commercial or public safety use cases.

When the resources are allocated to a user equipment (UE), e.g. using a per-UE basis in which different resources are allocated to different UEs, it may be difficult for a mobile communication network to keep control over the usage of the allocated resources when the UE enters an idle mode. For illustration, the mobile communication network conventionally does not have any knowledge on whether and when the allocated resources may be released again after a UE enters the idle mode.

SUMMARY

There is a need in the art for techniques which allow resources for a device-to-device discovery and/or a device-to-device communication to be allocated semi-persistently. There is in particular a need for such techniques which allow a mobile communication network to control a continued usage of allocated resources for the device-to-device discovery and/or the device-to-device communication when the user equipment enters an idle mode.

According to exemplary embodiments of the invention, a method, a user equipment, a base station, and a communication system are provided. A user equipment may be enabled to continue usage of allocated resources for the device-to-device discovery and/or for the device-to-device communication even when the user equipment enters an idle mode. The base station may control the continued usage of the allocated resources for the device-to-device discovery and/or for the device-to-device communication by the user equipment. This may be done in various ways, e.g. by enabling the user equipment to continue usage of the allocated resources in the idle mode, by requesting status information from the user equipment which indicates whether the user equipment still uses the allocated resources for the device-to-device discovery and/or for the device-to-device communication, and/or by causing the user equipment to terminate the usage of the allocated resources while the user equipment is in the idle mode.

A method according to an embodiment is used for allocating device-to-device resources. The device-to-device resources may be resources for device-to-device discovery and/or device-to-device communication. In the method, the user equipment may receive information on allocated resources while the user equipment is connected to a mobile communication network. The user equipment may continue a usage of the allocated resources for a device-to-device discovery and/or a device-to-device communication when the user equipment is in an idle mode.

This method allows the user equipment to enter the idle mode, while being enabled to continue the usage of the allocated resources. The mobile communication network may exert control over the usage of the allocated resources when the user equipment is in the idle mode.

The user equipment may receive a message from the mobile communication network. The user equipment may evaluate the message to determine whether the user equipment is enabled by the mobile communication network to continue the usage of the allocated resources for the device-to-device discovery and/or the device-to-device communication when the user equipment is in the idle mode. Thereby, the mobile communication network can selectively control continues usage of the allocated resources by the user equipment when the user equipment enters the idle mode.

The message may be a message transmitted to the user equipment when the user equipment enters idle mode.

The message may a message transmitted to the user equipment when a connection is released.

The message may be a Radio Resource Control (RRC) connection release message.

This allows the mobile communication network to exert control over the continued usage of the allocated resources by using a RRC release signaling which is needed anyway. Traffic load overheads are kept small.

The user equipment may determine whether the message, e.g. the Radio Resource Control connection release message, includes an enabler signaling which enables the user equipment to continue the usage of the allocated resources for the device-to-device discovery and/or the device-to-device communication when the user equipment is in the idle mode. This allows the user equipment to determine whether it is enabled to continue the usage of the allocated resources by evaluating the RRC release signaling which is received and processed anyway.

The user equipment may continue the usage of the allocated resources for the device-to-device discovery and/or the device-to-device communication in the idle mode only if the enabler signaling includes at least one indicator bit which indicates that the user equipment is enabled to continue the usage of the allocated resources when the user equipment is in the idle mode. The enabler signaling included in the message, e.g. the RRC connection release message, may thereby have compact format.

The enabler signaling may include one indicator bit which indicates that the user equipment is enabled to continue the usage of the allocated resources when the user equipment is in the idle mode. When the indicator bit has a first value, the user equipment may continue the usage of the allocated resources in the idle mode. When the indicator bit has a second value different from the first value, the user equipment may stop the usage of the allocated resources when it enters the idle mode.

The enabler signaling may include one parameter or several parameters for the continued usage of the allocated resources. For illustration, the enabler signaling included in the message may define a time period for which the user equipment may continue the usage of the allocated resources. The enabler signaling may alternatively or additionally define a validity area within which the user equipment may continue the usage of the allocated resources.

The user equipment may monitor a termination trigger event while the user equipment is in the idle mode. The user equipment may terminate the usage of the allocated resources for the device-to-device discovery and/or the device-to-device communication in response to detecting the termination trigger event. This allows the continued usage of the allocated resources to be terminated in a controlled way. The allocated resources may be re-allocated by the mobile communication network.

The termination trigger event may be a paging message received by the user equipment from the mobile communication network. The paging message may include an indicator, e.g. an indicator bit, which indicates that the user equipment is requested to terminate the usage of the allocated resources. This allows the mobile communication network to terminate the continued usage of the allocated resources by using a paging message which needs to be provided anyway.

The termination trigger event may be an expiry of a timer at the user equipment. A timer value of the release timer may be defined by the message received from the mobile communication network. This allows the mobile communication network to control termination of the continued usage of the allocated resources using the RRC signaling.

The user equipment may transmit a release resource report after terminating the usage of the allocated resources for the device-to-device discovery and/or the device-to-device communication. The user equipment may transmit the release resource report while it is still in the idle mode. The mobile communication network can thereby be informed that the usage of the allocated resources has been terminated, even when the mobile communication network did not actively request the usage to be terminated.

The user equipment may monitor a report trigger event while the user equipment is in the idle mode. The user equipment may transmit a status report to the mobile communication network in response to detecting the report trigger event. The status report may indicate whether the user equipment still continues the usage of the allocated resources for the device-to-device discovery and/or the device-to-device communication at a time of transmitting the status report. This allows the mobile communication network to retrieve information on resources that are presently in use for the device-to-device discovery and/or the device-to-device communication even when the user equipment has entered the idle mode in an uncontrolled manner. Examples where this may occur include loss of coverage, loss of synchronization, e.g. at power off, or cell reselection.

The report trigger event may be a paging message received by the user equipment from the mobile communication network. The paging message may include a request resource report bit which indicates that the mobile communication network requests information on the resources used for the device-to-device discovery and/or the device-to-device communication. This allows the mobile communication network to retrieve the status report using a paging message which must be provided at any rate.

The report trigger event may be an expiry of a timer at the user equipment. The report trigger event may be a cell reselection procedure. The report trigger event may be a tracking area update (TAU) procedure. The mobile communication network can thereby be kept informed of the resources which are used for the device-to-device discovery and/or the device-to-device communication.

The mobile communication may allocate the allocated resources to the user equipment in a semi-persistent manner.

The mobile communication may allocate the allocated resources to the user equipment in manner which is specific to the user equipment, i.e., on a per-UE basis, such that different resources are allocated to different user equipments.

According to another embodiment, a user equipment is provided. The user equipment comprises a wireless interface configured to communicate with a mobile communication network. The user equipment comprises a processing device coupled to the wireless interface and configured to receive information on allocated resources from the mobile communication network via the wireless interface while the user equipment is connected to the mobile communication network, and control the wireless interface to perform a device-to-device discovery and/or a device-to-device communication with at least one further user equipment using the allocated resources when the user equipment is in an idle mode.

The processing device may be configured to receive a message from the mobile communication network via the wireless interface. The processing device may be configured to evaluate the message to determine whether the user equipment is enabled by the mobile communication network to continue a usage of the allocated resources for the device-to-device discovery and/or the device-to-device communication when the user equipment is in the idle mode.

The processing device may be configured to monitor a termination trigger event while the user equipment is in the idle mode. The processing device may be configured to terminate the usage of the allocated resources for the device-to-device discovery and/or the device-to-device communication in response to detecting the termination trigger event.

The processing device may be configured to monitor a report trigger event while the user equipment is in the idle mode. The processing device may be configured to control the wireless interface to transmit a status report to the mobile communication network in response to detecting the report trigger event. The status report may indicate whether the user equipment still uses the allocated resources for the device-to-device discovery and/or the device-to-device communication.

The user equipment may be configured to perform the method according to an embodiment.

Additional features of the user equipment according to exemplary embodiments and the effects respectively attained thereby may correspond to the features explained with reference to the methods according to embodiments.

According to another embodiment, a base station is provided. The base station comprises a wireless interface and a control device configured to control the wireless interface to allocate resources for a device-to-device discovery and/or a device-to-device communication to a user equipment of a mobile communication network. The control device is configured to control the wireless interface to control a usage of the allocated resources by the user equipment when the user equipment is in an idle mode.

The control device may be configured to control the wireless interface to transmit a message to the user equipment which includes an enabler signaling which enables the user equipment to continue the usage of the allocated resources for the device-to-device discovery and/or the device-to-device communication when the user equipment is in the idle mode.

The control device may be configured to control the wireless interface such that the message is a message transmitted to the user equipment when the user equipment enters idle mode.

The control device may be configured to control the wireless interface such that the message is a message transmitted to the user equipment when a connection is released.

The control device may be configured to control the wireless interface such that the message is a RRC connection release message.

The control device may be configured to control the wireless interface such that the message, e.g. a RRC connection release message, includes an enabler signaling which is generated depending on whether the user equipment shall be enabled to continue a usage of the allocated resources in the idle mode.

The control device may be configured to control the wireless interface such that the enabler signaling includes one indicator bit which indicates that the user equipment is enabled to continue the usage of the allocated resources when the user equipment is in the idle mode.

The control device may be configured to control the wireless interface such that the enabler signaling includes one parameter or several parameters for the continued usage of the allocated resources. For illustration, the enabler signaling included in the message may define a time period for which the user equipment may continue the usage of the allocated resources. The enabler signaling may alternatively or additionally define a validity area within which the user equipment may continue the usage of the allocated resources.

The control device may be configured to control the wireless interface to transmit a paging message to the user equipment to request the user equipment to terminate the usage of the allocated resources while the user equipment is in the idle mode. The paging message may include an indicator, e.g. an indicator bit, which indicates that the user equipment is to terminate the usage of the allocated resources.

The control device may be configured to control the wireless interface to transmit a paging message to the user equipment to request the user equipment to provide status information on the usage of the resources used for the device-to-device discovery and/or the device-to-device communication while the user equipment is in the idle mode. The paging message may include a request resource report bit which indicates that the mobile communication network requests information on the resources used for the device-to-device discovery and/or the device-to-device communication.

The control device may be configured to control the wireless interface to semi-persistently allocate the resources to the user equipment in a manner specific to the user equipment.

The control device may be configured to control the wireless interface to allocate the resources to the user equipment in manner which is specific to the user equipment, i.e., on a per-UE basis, such that different resources are allocated to different user equipments.

The base station may be an evolved NodeB (eNodeB). The base station and the user equipment may be configured to communicate with each other over an evolved UTRA (E-UTRA) air interface.

According to another embodiment, a communication system is provided which comprises a base station according to an embodiment and at least one user equipment according to an embodiment.

In the methods, devices, and systems according to embodiments, the allocated resources may be periodic uplink resources. The periodic uplink resources may be divided into time-frequency resources. The periodic uplink resources may be divided into time-frequency resources according to frequency division multiplexing (FDM) and/or time division multiplexing (TDM).

In the methods, devices, and systems according to embodiments, a user equipment may be enabled to continue the usage of the allocated resources for the device-to-device discovery and the device-to-device communication even when the user equipment is in the idle mode. The mobile communication network may control the continued usage of the allocated resources by the user equipment.

Although specific features described in the above summary and the following detailed description are described in the context of specific embodiments and aspects of the invention, the features of the embodiments and aspects may be combined with each other unless specifically noted otherwise.

BRIEF DESCRIPTION OF DRAWINGS

Embodiments of invention will now be described in more detail with reference to the accompanying drawings in which like or identical reference numerals designate like or identical elements.

FIG. 1 shows a communication system according to an embodiment.

FIG. 2 shows the communication system of FIG. 1, which includes a Proximity Service-enabled user equipment.

FIG. 3 is a flow chart of a method according to an embodiment.

FIG. 4 is a diagram which shows a signaling in a communication system according to an embodiment.

FIG. 5 is a flow chart of a method according to an embodiment.

FIG. 6 is a diagram which shows a signaling in a communication system according to an embodiment.

FIG. 7 shows a connection release message which may be transmitted to a user equipment according to an embodiment.

FIG. 8 shows a connection release message which may be transmitted to a user equipment according to an embodiment.

FIG. 9 is a diagram which shows a signaling in a communication system according to an embodiment.

FIG. 10 is a diagram which shows a signaling in a communication system according to an embodiment.

FIG. 11 is a diagram which shows a signaling in a communication system according to an embodiment.

FIG. 12 is a diagram which shows a signaling in a communication system according to an embodiment.

FIG. 13 is a diagram which shows a signaling in a communication system according to an embodiment.

FIG. 14 shows a paging message which may be transmitted to a user equipment according to an embodiment.

FIG. 15 is a diagram which shows a signaling in a communication system according to an embodiment.

DESCRIPTION OF EMBODIMENTS

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) communication, it is to be understood that the techniques for D2D discovery and D2D communication may be used for a wide variety of use cases, including public safety use cases and other commercial use cases. While exemplary embodiments will be described in the context of certain cellular mobile communication networks, e.g. Long Term Evolution (LTE) networks, the embodiments are not described to such mobile communication techniques.

While exemplary embodiments will be described with reference to a base station which transmits information on allocated resources, it is to be understood that a user equipment may receive information on the allocated resources also from a repeater relay or another user equipment which acts as a group head for D2D communication, for example.

FIG. 1 shows a communication system 1 according to an embodiment. The communication system 1 includes a mobile communication system which is configured as a cellular wireless communication network. The cellular wireless communication network may comprise a plurality of base stations 11, 18. The base stations 11, 18 may communicate with each other via wireless radio communications or via an operator core network. The cellular wireless communication network may be a Long Term Evolution (LTE) network. A radio access network (RAN) of the cellular wireless communication network may be an evolved UTRAN (E-UTRAN), with the base station 11, 18 being an evolved Node B (eNodeB). The base stations 11, 18 may be connected to a Mobility Management Entity (MME) and/or Serving Gateway (S-GW) in the operator core network.

The base station 11 provides a radio cell 9 in which user equipments (UEs) 2, 3, 4, 5 may communicate directly with the base station 11 via radio communication 8. The UEs 2, 3, 4, 5 may respectively have a wireless interface for communication with the E-UTRAN. The base station 18 provides another radio cell 19.

At least one of the UEs 2, 3, 4, 5 is capable of performing a D2D discovery for D2D communication. According to the terminology in the pertinent field of the art, the term D2D communication refers to a radio communication between UEs which is performed directly between the UEs. The radio signals 6, 7 transmitted in the D2D communication may not be processed by the base stations 11, 18. The radio signals 6, 7 transmitted in the D2D communication may not pass the RAN of the communication network. The radio signals 6, 7 transmitted in the D2D communication may not be processed by a core network of the wireless cellular communication network. The UEs which are configured for D2D communication may use the same wireless interface for communicating with the RAN and for D2D communication. A UE configured for D2D discovery and D2D communication may also be referred to as Proximity Service (ProSe)-enabled UE in the art.

In order to identify suitable communication partners for D2D communication, a UE capable of performing D2D communication may be configured to perform a D2D discovery. In the D2D discovery, a UE may discover at least one further UE located in proximity of the UE and configured to engage in D2D communication with the UE. The D2D discovery may include a radio signaling between UEs which is performed directly between the UEs. The radio signals transmitted in the D2D discovery may not be processed by the base station 11. The radio signals transmitted in the D2D discovery may not pass through the RAN of the communication network. The radio signals transmitted in the D2D discovery may not be processed by a core network of the wireless cellular communication network. The UEs which are configured for D2D communication may use the same wireless interface for communicating with the RAN and for D2D discovery.

The UEs 2, 3, 4 which are configured for D2D communication may use allocated resources for the D2D discovery. The allocated resources for the D2D discovery may be allocated to the UEs 2, 3, 4 by the base station 11, by a repeater relay or by another UE. The allocated resources may respectively be allocated by the base station 11 in a semi-persistent manner such that they are not limited to one specific discovery or communication procedure. At least in some use cases, the resources may be allocated on a per-UE basis, such that different resources are allocated to different UEs, e.g. for transmitting or receiving radio signals in the D2D discovery.

Examples for use cases in which the resources may be allocated on a per-UE basis include advertisement points, vending terminals, other commercial use cases or public safety use cases. In the following, the resources which are semi-persistently allocated to a UE for D2D discovery and/or for D2D communication on a per-UE basis will also be referred to as "allocated resources". The allocated resources may be used at least for D2D discovery, for example.

The allocated resources may be periodic uplink resources. The allocated resources may be divided in the time domain, e.g. according to time division multiplexing (TDM), and/or in the frequency domain, e.g. according to frequency division multiplexing (FDM). The UEs 2, 3, 4 may use at least one physical resource block for the D2D discovery and/or D2D communication which would otherwise be used for uplink communication with the base station of the serving cell.

As will be described in more detail below, the base station 11, 18 is configured to allocate resources to a UE 2 for D2D discovery and/or D2D communication. The base station 11, 18 may be configured to control the continued usage of the allocated resources for D2D discovery and/or D2D communication when the UE 2 enters the idle mode. The base station 11, 18 may be configured to enable the UE 2 to continue using the allocated resources even when the UE 2 enters the idle mode. The base station 11, 18 may be configured to retrieve status information from the UE 2 which indicates the resources presently used by the UE 2 for D2D discovery and/or D2D communication when the UE is in the idle mode. The base station 11, 18 may be configured to control termination of the usage of the allocated resources for the D2D discovery and/or D2D communication when the UE is in the idle mode. Procedures and signaling according to various embodiments will be described in detail with reference to FIG. 3 to FIG. 15 below.

FIG. 2 is a schematic block diagram of a communication system 1 according to an embodiment. The base station 11 of the RAN 10 is connected to a node 15 of the RAN or the core network (CN). For illustration, for a base station 11 implemented as an eNodeB, the node 15 may be an MME or S-GW.

The UE 2 has a wireless interface 20. The wireless interface 20 may be configured to communicate with the RAN 10. The wireless interface 20 may be configured for communication over the E-UTRA air interface.

The UE 2 has a processing device 24 connected to the wireless interface 20. The processing device 24 may comprise one or several microprocessors, one or several microcontrollers, one or several processors, one or several controllers, one or several application specific integrated circuits (ASICs) and/or a combination of such devices.

The processing device 24 may be configured to retrieve information on the allocated resources for D2D discovery and/or D2D communication from a message received at the wireless interface 20. The processing device 24 may be configured to determine whether a message received from the base station 11 at the wireless interface 20 includes enabler signaling which enables the UE 2 to continue a usage of the allocated resources for D2D discovery and/or D2D communication after the UE 2 has entered the idle mode. The processing device 24 may be configured to execute a wide variety of other functions which allow the mobile communication network to control the usage of the allocated resources by the UE 2 for D2D discovery and/or D2D communication after the UE 2 has entered the idle mode.

Both when the UE 2 is in the connected mode and when the UE 2 is in the idle mode, the processing device 24 may be configured to control the wireless interface 20 to detect a further UE 3 located in proximity to the UE 2. The processing device 24 may be configured to control the wireless interface 20 to perform a D2D discovery. The processing device 24 may be configured to control a transmitter path 23 of the wireless interface 20 to transmit a signal to the further UE 3 via an antenna 21 to indicate that the UE 2 is looking for a further UE for D2D communication and/or to indicate that the UE 2 would be capable of performing D2D communication. The processing device 24 may be coupled to a receiver path 22 of the wireless interface 20 to process a message received from the further UE 3. The message received from the further UE 3 may indicate that the further UE 3 would be suitable for D2D communication. Both when the UE 2 is in connected mode and when the UE 2 is in idle mode, the processing device 24 may be configured to control the wireless interface 20 to transmit radio signals for D2D discovery which are generated in accordance with the allocated resources.

The base station 11 includes a wireless interface 12. The wireless interface 12 may be configured to communicate with the UE 2. The wireless interface 12 may be configured for communication over the E-UTRA air interface.

A control device 13 of the base station 11 may control the wireless interface 12 to allocate resources for the D2D discovery. The control device 13 may comprise one or several microprocessors, one or several microcontrollers, one or several processors, one or several controllers, one or several application specific integrated circuits (ASICs) and/or a combination of such devices.

The control device 13 may control the wireless interface 12 to allocate resources for D2D discovery and/or D2D communication to the UE 2. The control device 12 may control the wireless interface 12 to allocate resources for D2D discovery and/or D2D communication to the UE 2 on a per-UE basis. I.e., the allocated resources are specifically allocated to the UE 2, while other resources are allocated to other UEs.

The control device 13 may control a usage of the allocated resources for D2D discovery and/or D2D communication by the UE 2 when the UE 2 is in the idle mode. The control device 13 may control the wireless interface 12 to transmit a message, e.g. an RRC connection release message, which enables the UE 2 to continue the usage of the allocated resources for D2D discovery and/or D2D communication when the UE 2 is in the idle mode. The control device 13 may control the wireless interface 12 to request information on resources which are presently being used by the UE 2 for D2D discovery and/or D2D communication when the UE 2 is in the idle mode. The control device 13 may transmit a paging message with a request resource report bit to the UE 2, and the base station 11 may receive a status report from the UE 2 in response thereto. The control device 13 may transmit a paging message with a termination indicator to the UE 2 to request the UE 2 to terminate the usage of the allocated resources for D2D discovery and/or D2D communication when the UE 2 is in the idle mode.

FIG. 3 is a flow chart of a method 30 according to an embodiment. The method may be performed by a UE according to an embodiment.

At 31, the UE receives a D2D resource allocation message from a mobile communication network. The D2D resource allocation message may semi-persistently allocate resources for D2D discovery and/or D2D communication to the UE. The D2D resource allocation message may be received while the UE is in a Radio Resource Control (RRC) connected mode.

At 32, the UE may perform D2D discovery and/or D2D communication using the allocated resources. The UE may transmit radio signals to detect at least one further UE for D2D communication in the D2D discovery using the allocated resources indicated by the D2D resource allocation message.

At 33, the UE enters an idle mode. The idle mode may be an RRC idle mode. In the RRC idle mode, the UE may be disconnected from the RAN of the mobile communication network. The UE may enter the idle mode in response to receiving an RRC connection release message.

At 34, the UE may continue a usage of the allocated resources for D2D discovery and/or D2D communication while the UE is in idle mode. The continued usage of the allocated resource may be controlled by the base station in various ways, as will be explained in more detail with reference to FIG. 4 to FIG. 15.

FIG. 4 is a diagram which illustrates signaling in a communication system according to an embodiment. A UE performs an RRC connection setup 41 with a base station, which may be an eNodeB. The UE may perform an attach/packet data network (PDN) connection establishment. The UE may receive a D2D resource allocation message 42 from the eNodeB. The D2D resource allocation message 42 may include information on resources which are allocated to the UE for D2D discovery and/or D2D communication. The allocated resources may be periodic uplink resources. The allocated resources may be allocated on a per-UE basis. Other resources may be allocated to other UEs which are different from the UE. The UE may perform D2D discovery and/or D2D communication 43 with at least one further UE. The UE may transmit radio signals to the further UE in the D2D discovery using the allocated resources.

In response to receiving a RRC Connection Release message 44, the UE enters the RRC idle mode. At 45, the UE may evaluate the RRC connection release message 44 to determine whether the eNodeB enables the UE to continue using the allocated resources for D2D discovery and/or D2D communication also in the idle mode. While still in the idle mode, the UE may continue to perform D2D discovery and/or D2D communication 46 with at least one further UE. The UE may transmit radio signals to the further UE in the D2D discovery 46 using the allocated resources which were allocated by the D2D resource allocation message 42.

While a connection release message, e.g. the RRC connection release message 44, may be evaluated by the user equipment to determine whether the user equipment may continue using the allocated resources in idle mode, the user equipment may evaluate any one of a variety of other messages to determine whether it is enabled to continue using the allocated resources in idle mode for D2D discovery and/or D2D communication.

The mobile communication network may control the continued usage of the allocated resources for D2D discovery and/or D2D communication by the UE not only when the UE enters the idle mode, but also while the UE operates in idle mode. Procedures according to exemplary embodiments will be explained in more detail with reference to FIG. 5 to FIG. 15.

FIG. 5 is a flow chart of a method 50 according to an embodiment. The method 50 may be performed by a UE according to an embodiment.

At 51, the UE receives a D2D resource allocation message from a mobile communication network while the UE is connected to the mobile communication network. At 52, the UE enters an RRC idle mode. The UE may enter the idle mode in response to receiving a RRC Connection Release message from the RAN of the mobile communication network.

At 53, the UE determines whether it is enabled to continue a usage of the allocated resources for D2D discovery and/or D2D communication while the UE is in the idle mode. The UE may analyze a message, e.g. the RRC Connection Release message, from the RAN to determine whether the UE is enabled to continue the usage of the allocated resources, as will be described in more detail with reference to FIG. 6 to FIG. 9. The UE may determine whether the message, e.g. the RRC Connection Release message, includes at least one indicator bit which enables the UE to continue usage of the allocated resources. When the UE determines that the mobile communication network does not enable the UE to continue using the allocated resources, the UE stops the usage of the allocated resources for D2D discovery and/or D2D communication at 54. Otherwise, the method proceeds to step 55.

At 55, the UE continues the usage of the allocated resources for D2D discovery and/or D2D communication while the UE is in the idle mode. The UE may transmit radio signals for D2D communication in accordance with the allocated resources while the UE is in the idle mode.

At 56, the UE monitors whether a report trigger event occurs. The report trigger event may be receipt of a message from the mobile communication network in which the mobile communication network requests status information on the resources which are used by the UE, as will be explained in more detail with reference to FIG. 12 to FIG. 15. The report trigger event may be any one of a wide variety of other events, e.g. a cell reselection performed by the UE or a timer timeout. If the report trigger event is not detected, the method may proceed to step 58. Otherwise, the method may proceed to step 57.

At 57, the UE transmits a status report to the mobile communication network in response to detecting the report trigger event. The status report may indicate that the UE still uses the allocated resources. The status report may include resource information on the resources which are used by the UE.

At 58, the UE monitors whether a termination trigger event occurs. The termination trigger event may be receipt of a message from the mobile communication network in which the mobile communication network requests the UE to stop the usage of the allocated resources for the D2D discovery and/or D2D communication, as will be explained in more detail with reference to FIG. 6 to FIG. 9. The termination trigger event may be any one of a wide variety of other events, e.g. a timeout of a validity timer or release timer at the UE, as will be explained in more detail with reference to FIG. 10 and FIG. 11. If the termination trigger event is not detected, the method may return to step 55. If the termination trigger event is detected, the UE stops the usage of the allocated resources for D2D discovery and/or D2D communication while the UE is in the RRC idle mode at 59.

FIG. 6 is a diagram which shows signaling in a communication system according to an embodiment. While the UE is in a RRC connected mode 61, the UE may receive the D2D resource allocation message 42. Receipt of a RRC Connection Release message 44 triggers the UE to enter the RRC idle mode 62. When the RRC Connection Release message 44 includes an enabler signaling which indicates that the UE is enabled to continue the usage of the allocated resources also in the RRC idle mode, the UE may continue using the allocated resources defined by the D2D resource allocation message 42 for D2D discovery and/or D2D communication while operating in the RRC idle mode 62. The UE can use the allocated resources for D2D discovery and/or D2D communication in the RRC idle mode 62 only if the RRC Connection Release message 44 includes the enabler signaling which indicates that the UE may continue usage of the allocated resources. If the RRC Connection Release message 44 does not include this enabler signaling, the UE stops using the allocated resources when entering the idle mode.

The enabler signaling may include an indicator bit which indicates whether the mobile communication network permits the UE to continue using the allocated resources. The enabler signaling included in the RRC Connection Release message 44 may include at least one parameter which defines the continued usage. The parameter may include one or several of a resource index defining the resource(s) which may be used, a periodicity in a time domain, a validity timer, a validity area, a release timer, or similar.

The eNodeB may transmit a paging message 66 which includes a termination indicator. The eNodeB may transmit the paging message 66 to request the UE to terminate the continued usage of the allocated resources for D2D discovery and/or D2D communication. The UE may receive the paging message 66 while it operates in the RRC idle mode 62. In response to receiving the paging message 66 which includes the termination indicator, the UE may terminate the usage of the allocated resources for D2D discovery and/or D2D communication. The termination indicator may be a single bit in a paging message which acts as an end of idle resource usage indicator. The termination indicator may be an additional bit which is newly defined in the paging message or may be a reassigned existing bit.

The UE may terminate the usage of the allocated resource at an end of a paging cycle in which the paging message 66 is received. The UE may terminate the usage of the allocated resource at an end of a paging cycle which directly follows the paging cycle in which the paging message 66 is received. The UE may terminate the usage with a fixed time offset after receipt of the paging message 66.

The enabler signaling does not need to be included in the RRC Connection Release message, but may also be included in other messages. The enabler signaling which enables the user equipment to continue using the allocated resource for D2D discovery and/or D2D communication may be included in a message transmitted by the cellular network when the user equipment enters idle mode or while the user equipment is in idle mode.

FIG. 7 illustrates a RRC Connection Release message 44 which may be transmitted from the eNodeB to the UE. The RRC Connection Release message 44 includes at least one indicator bit 72 which can be set to a first value to indicate that the UE is enabled to continue the usage of the allocated resources and to second value different from the first value to indicate that the UE is not enabled to continue the usage of the allocated resources. The RRC Connection Release message 44 includes a single indicator bit 72 which enables or disables the continued usage of the allocated resources for D2D discovery and/or D2D communication. The RRC Connection Release message 44 may include other data 73, such as an identifier for the RRC Connection Release message or address information.

The at least one indicator bit 72 may be included in a message different from the RRC Connection Release message 44.

FIG. 8 illustrates a RRC Connection Release message 44 which may be transmitted from the eNodeB to the UE. The RRC Connection Release message 44 includes one parameter or several parameters 74. The eNodeB can further control the continued usage of the allocated resources by the UE by transmitting the parameter(s) 74 as part of the enabler signaling in the RRC Connection Release message 44. The parameter(s) 74 may include a resource index which indicates the allocated resources in the time or frequency domain. Alternatively or additionally, the parameter(s) 74 may include a periodicity which defines a time interval between periodic uplink resources which the UE can continue to use for D2D discovery and/or D2D communication. Alternatively or additionally, the parameter(s) 74 may include a release timer which may define a number of periodic cycles of the periodic uplink resources after which the allocated resources will be released. Alternatively or additionally, the parameter(s) 74 may include a validity area which defines in which area the UE may continue using the allocated resources for D2D discovery and/or D2D communication. The continued use may be confined in the spatial domain, e.g. to a cell or to several cells of a cellular communication network. One example where this may be useful is a commercial use case in which the resources are allocated for communication with an advertisement point or another commercial device. Alternatively or additionally, the parameter(s) 74 may include a duration which defines validity time for which the UE may continue using the allocated resources for D2D discovery and/or D2D communication.

The enabler signaling with the parameter(s) 74 may be included in a message different from the RRC Connection Release message 44.

In any one of the methods, devices and systems described herein, the timing at which the UE performs D2D discovery and/or D2D communication in accordance with the allocated resources can be linked to a System Frame Number (SFN). The UE may start a first one of cyclic resources with a fixed time offset after receipt of the RRC Connection Release message 44.

In any one of the methods, devices and systems described herein, the UE may actively request that it will be enabled to continue the usage of the allocated resources for D2D discovery and/or D2D communication in the idle mode, as will be explained in more detail with reference to FIG. 9.

FIG. 9 is a diagram which shows signaling in a communication system according to an embodiment. While the UE is in a RRC connected mode 61, the UE transmits a UE request 63 to the eNodeB. The UE request 63 is transmitted to inform the eNodeB that the UE may wishes to continue usage of the allocated resources for D2D discovery and/or D2D communication in the idle mode. When the eNodeB receives the UE request 63 and the eNodeB grants the UE request 63, the eNodeB transmits an RRC Connection Release Message 44 which enables the UE to continue usage of the allocated resources for D2D discovery and/or D2D communication in the idle mode.

While the eNodeB terminates the usage of the allocated resources by transmission of a message in the signaling of FIG. 6 and FIG. 9, a wide variety of other termination trigger events may be used in addition or as an alternative thereto, as will be explained in more detail with reference to FIG. 10 and FIG. 11.

FIG. 10 is a diagram which shows signaling in a communication system according to an embodiment. The UE may be enabled to continue usage of the allocated resources for D2D discovery and/or D2D communication as explained with reference to FIG. 1 to FIG. 9 above. At 64, the UE may start a validity timer when it enters the RRC idle mode 62. At 65, the UE may detect a timeout of the validity timer. The timeout of the validity timer acts as a termination trigger event which causes the UE to terminate the usage of the allocated resources. A timer value of the validity timer may be set by the RRC Connection Release message 44, for example, or in another message. The validity timer value may be set to a default value, e.g. if no timer value is defined by the parameter(s) 74 of the RRC Connection Release message 44.

Still other termination trigger events may be monitored additionally or alternatively in further embodiments. For illustration, the termination trigger event may be that the UE leaves a validity area. The validity area may be defined by the parameter(s) 74 of the RRC Connection Release message 44 or of another message. The termination trigger event may be that a pre-defined number of cycles of periodic resources has been completed, which may be defined by a release timer. The termination trigger event may be a cell reselection procedure. The termination trigger event may be a termination of the D2D services by the UE, e.g. in response to a user action. The termination trigger event may be a power off of the UE. The termination trigger event may be an activation of a flight mode of the UE.

In any one of the various techniques disclosed herein, the UE may transmit a release resource report to the eNodeB when it stops using the allocated resources for D2D discovery and/or D2D communication. The release resource report may inform the mobile communication network that the UE does no longer use the allocated resources for D2D discovery and/or D2D communication. The mobile communication network may then re-allocate the released resources.

FIG. 11 is a diagram which shows signaling in a communication system according to an embodiment. The UE may be enabled to continue usage of the allocated resources for D2D discovery and/or D2D communication as explained with reference to FIG. 1 to FIG. 10 above. At 68, the UE detects a termination trigger event. The termination trigger event may be receipt of a paging message, as described with reference to FIG. 6 and FIG. 9. The termination trigger event may be expiry of a validity or release timer, as explained with reference to FIG. 10. The termination trigger event may consist in that the UE moves out of coverage of a validity area. The termination trigger event may be a cell reselection procedure. The termination trigger event may be a termination of the D2D services by the UE, e.g. in response to a user action. The termination trigger event may be a power off of the UE. The termination trigger event may be an activation of a flight mode of the UE.

The termination trigger event 68 causes the UE to terminate the usage of the allocated resources for D2D discovery and/or D2D communication at 67. The UE transmits a release resource report 69 to the eNodeB to inform the mobile communication network that the UE stopped using the allocated resources for D2D discovery and/or D2D communication.

The eNodeB may retrieve information on the resources which are used by the UE for D2D discovery and/or D2D communication also while the UE continues the usage of the resources, as will be explained in more detail with reference to FIG. 12 to FIG. 15.

FIG. 12 is a diagram which shows signaling in a communication system according to an embodiment. The UE may be enabled to continue usage of the allocated resources for D2D discovery and/or D2D communication as explained with reference to FIG. 1 to FIG. 11 above. The UE performs D2D discovery and/or D2D communication using the allocated resources while operating in the RRC idle mode 62. The UE monitors a report trigger event 81. Detection of the report trigger event 81 causes the eNodeB to transmit a status report 82 to the eNodeB.

The status report 82 may include a status indicator bit which indicates whether the UE still uses the allocated resources for D2D discovery and/or D2D communication.

The status report 82 may include additional information on the resources which are being used by the UE for D2D discovery and/or D2D communication. The information on the resources may include information on a resource index of the resources, a periodicity of the resources in the time domain or in the frequency domain, a size of the resources in the time domain or in the frequency domain, or other information.

The status report 82 may include additional information on a usage of the allocated resources or charging information. This information may include transmit times, a number of D2D communications performed, a number of D2D discoveries performed, a duration of D2D communications performed, or other information.

The status report 82 may also include information on a request for a future usage of the resources, as will be explained in more detail with reference to FIG. 15.

The report trigger event 81 may be any one of a variety of events. The report trigger event 81 may be receipt of a message from the eNodeB, as will be explained in more detail with reference to FIG. 13. The report trigger event 81 may additionally or alternatively be a cell reselection, a tracking area update (TAU) procedure, expiration of a validity or release timer, or when the UE leaves a validity area.

FIG. 13 is a diagram which shows signaling in a communication system according to an embodiment. The UE may be enabled to continue usage of the allocated resources for D2D discovery and/or D2D communication as explained with reference to FIG. 1 to FIG. 10 above. The UE performs D2D discovery and/or D2D communication using the allocated resources while operating in the RRC idle mode 62. Receipt of a paging message 83 which includes report request information may trigger the transmission of the status report 82. The report request information may comprise one request resource report bit included in the paging message 83.

FIG. 14 illustrates a configuration of the paging message 83 which includes the report request information. The paging message 83 may be transmitted from the eNodeB to the UE. The paging message 83 includes at least one request resource report bit 92 which can be set to a first value to indicate that the eNodeB requests status information on the resources used by the UE for D2D discovery and/or D2D communication. The paging message 83 may include other data 73, such as address information. The paging message 83 may include additional information which indicates whether the eNodeB only requests information on whether the UE still uses the allocated resources, or whether the eNodeB requests transmission of addition information on the resources or the usage of the allocated resources.

FIG. 15 is a diagram which shows signaling in a communication system according to an embodiment. The UE may be enabled to continue usage of the allocated resources for D2D discovery and/or D2D communication as explained with reference to FIG. 1 to FIG. 11 above. The UE performs D2D discovery and/or D2D communication using the allocated resources while operating in the RRC idle mode 62. Receipt of a paging message 83 which includes report request information may trigger the transmission of the status report 82. The UE may include information on an intended future usage of the allocated resources in the status report 82. The information on the intended future usage may be included in the status report 82 when a validity timer or a release timer is less than a threshold. The information on the intended future usage may be transmitted to cause the eNodeB to enable the UE to continue using the allocated resources.

When the eNodeB approves the intended future usage indicated by the UE, the eNodeB may transmit a message 84 to the UE to enable the future use of the allocated D2D resources. The message 84 may include a new validity timer or release timer value, for example.

In any one of the various embodiments, the D2D discovery and/or the D2D communication performed by a UE may include the transmission and/or reception of messages which takes place over the same interface with which the UE communicates with the RAN.

Modifications or alterations may be implemented in other embodiments. For illustration, resources may be allocated to the UE not only directly by a base station, but also by another UE which acts as a group head for a D2D communication group, or by a repeater relay. For further illustration, while RRC release signaling or paging signaling may be used by the eNodeB to enable the UE to continue the usage of the allocated resources in the idle mode, and/or to terminate the usage of the allocated resources, and/or to request status information, other messages may be used for these control operation. For illustration, a dedicated signaling may be used.

Embodiments of the invention provide a mobile communication network with enhanced control over the usage of allocated resources by a UE for D2D discovery and/or D2D communication in the idle mode. The embodiments also provide the mobile communication network with enhanced control over the usage of allocated resources when a UE moves out of a serving cell, when synchronization is lost, or when the UE powers off. Resources may be used more efficiently by the mobile communication network.

The invention claimed is:

1. A method for a device-to-device resource allocation, comprising:
    receiving, by a user equipment, information on allocated resources while the user equipment is connected to a mobile communication network,
    continuing a usage of the allocated resources for a device-to-device discovery and/or a device-to-device communication by the user equipment when the user equipment is in an idle mode,
    monitoring, by the user equipment, a report trigger event while the user equipment is in the idle mode, and
    transmitting, by the user equipment, a status report to the mobile communication network in response to detecting the report trigger event, the status report indicating whether the user equipment still continues usage of the allocated resources for the device-to-device discovery and/or the device-to-device communication.

2. The method of claim 1, wherein said method further comprises:
    receiving, by the user equipment, a message from the mobile communication network, and
    evaluating the message by the user equipment to determine whether the user equipment is enabled by the mobile communication network to continue the usage of the allocated resources for the device-to-device discovery and/or the device-to-device communication when the user equipment is in the idle mode.

3. The method of claim 2, wherein the message is a Radio Resource Control connection release message, and wherein the evaluating comprises:
    determining whether the Radio Resource Control connection release message includes an enabler signaling which enables the user equipment to continue the usage of the allocated resources for the device-to-device discovery and/or the device-to-device communication when the user equipment is in the idle mode.

4. The method of claim 3,
    wherein the user equipment continues the usage of the allocated resources for the device-to-device discovery and/or the device-to-device communication in the idle mode only if the enabler signaling includes at least one indicator bit which indicates that the user equipment is enabled to continue the usage of the allocated resources when the user equipment is in the idle mode.

5. The method of claim 1, further comprising:
    monitoring a termination trigger event by the user equipment while the user equipment is in the idle mode, and
    terminating the usage of the allocated resources for the device-to-device discovery and/or the device-to-device communication in response to detecting the termination trigger event.

6. The method of claim 5,
    wherein the termination trigger event is at least one of
        a paging message received by the user equipment from the mobile communication network, or
        expiry of a release timer or of a validity timer at the user equipment.

7. The method of claim 5, further comprising:
    transmitting a release resource report from the user equipment to the mobile communication network after terminating the usage of the allocated resources for the device-to-device discovery and/or the device-to-device communication.

8. The method of claim 1,
    wherein the report trigger event is at least one of
        a paging message received by the user equipment from the mobile communication network, or
        expiry of a release timer or validity timer at the user equipment, or
        a cell reselection procedure, or
        a tracking area update procedure.

9. The method of claim 1,
    wherein the mobile communication network semi-persistently allocates the allocated resources to the user equipment.

10. The method of claim 1,
    wherein the continuing the usage of the allocated resources for the device-to-device discovery and/or the device-to-device communication by the user equipment occurs when the UE enters the idle mode and while the UE operates in the idle mode.

11. The method of claim 1, further comprising:
    receiving, by the user equipment, a Radio Resource Control (RRC) connection release message comprising at least one indicator bit that is selectively set to a first value to indicate that the user equipment is enabled to continue the usage of the allocated resources or to second value different from the first value to indicate that the user equipment is not enabled to continue the usage of the allocated resources.

12. The method of claim 1, further comprising:
    receiving, by the user equipment, a Radio Resource Control (RRC) connection release message comprising a resource index indicating the allocated resources in a time domain or a frequency domain.

13. The method of claim 1, further comprising:
receiving, by the user equipment, a Radio Resource Control (RRC) connection release message comprising an indication of a periodicity that indicates a time interval between periodic uplink resources for the user equipment to use for the device-to-device discovery and/or a device-to-device communication.

14. The method of claim 1, further comprising:
receiving, by the user equipment, a Radio Resource Control (RRC) connection release message comprising an indication of a release timer that indicates periodic cycles of the periodic uplink resources after which the allocated resources will be released.

15. A user equipment, comprising:
a wireless interface configured to communicate with a mobile communication network, and
a processing device coupled to the wireless interface and configured to:
  receive information on allocated resources from the mobile communication network via the wireless interface while the user equipment is connected to the mobile communication network, and
  control the wireless interface to perform a device-to-device discovery and/or a device-to-device communication with at least one further user equipment continuously using the allocated resources when the user equipment is in an idle mode,
  monitor a report trigger event while the user equipment is in the idle mode, and
  control the wireless interface of the user equipment to transmit a status report to the mobile communication network in response to detecting the report trigger event, the status report indicating whether the user equipment still continues usage of the allocated resources for the device-to-device discovery and/or the device-to-device communication.

16. The user equipment of claim 15, wherein the processing device is further configured to:
receive a message from the mobile communication network via the wireless interface, and
evaluate the message to determine whether the user equipment is enabled by the mobile communication network to continue a usage of the allocated resources for the device-to-device discovery and/or the device-to-device communication when the user equipment is in the idle mode.

17. The user equipment of claim 15, wherein the processing device is further configured to:
monitor a termination trigger event while the user equipment is in the idle mode, and
terminate the usage of the allocated resources for the device-to-device discovery and/or the device-to-device communication in response to detecting the termination trigger event.

18. The user equipment of claim 15, wherein the processing device is further configured to control the wireless interface to continue the usage of the allocated resources for the device-to-device discovery and/or the device-to-device communication when the user equipment enters the idle mode and while the user equipment operates in the idle mode.

19. A base station, comprising:
a wireless interface, and
a control device configured to control the wireless interface to allocate resources for a device-to-device discovery and/or a device-to-device communication to a user equipment of a mobile communication network,
wherein the control device is configured to control the wireless interface to control continuing a usage of the allocated resources by the user equipment while the user equipment is in an idle mode, and
wherein the control device is further configured to control the wireless interface to receive, from the user equipment, a status report indicating whether the user equipment still continues usage of the allocated resources for the device-to-device discovery and/or the device-to-device communication.

20. The base station of claim 19,
wherein the control device is configured to control the wireless interface to transmit a message to the user equipment which includes an enabler signaling which enables the user equipment to continue the usage of the allocated resources for the device-to-device discovery and/or the device-to-device communication when the user equipment is in the idle mode.

21. The base station of claim 19,
wherein the control device is configured to control the wireless interface to control continuing the usage by the user equipment of the allocated resources for the device-to-device discovery and/or the device-to-device communication when the user equipment enters the idle mode and while the user equipment operates in the idle mode.

22. The base station of claim 19,
wherein the control device is further configured to control the wireless interface to semi-persistently allocate the resources to the user equipment in a manner specific to the user equipment.

\* \* \* \* \*

UNITED STATES PATENT AND TRADEMARK OFFICE
CERTIFICATE OF CORRECTION

PATENT NO. : 10,368,339 B2
APPLICATION NO. : 15/111098
DATED : July 30, 2019
INVENTOR(S) : Zhao et al.

Page 1 of 1

It is certified that error appears in the above-identified patent and that said Letters Patent is hereby corrected as shown below:

On the Title Page

Item (30) Foreign Application Priority Data:
Please correct "2014 1 0076024" to read -- 2014 1 0076024.5 --

Signed and Sealed this
Twelfth Day of November, 2019

Andrei Iancu
*Director of the United States Patent and Trademark Office*